(12) United States Patent
Ignatchenko et al.

(10) Patent No.: US 7,235,758 B2
(45) Date of Patent: Jun. 26, 2007

(54) MIG-PLASMA WELDING

(75) Inventors: Georgiy Ignatchenko, Troy, MI (US); Igor Dykhno, West Bloomfield, MI (US)

(73) Assignee: Plasma Laser Technologies Ltd., Yokneam (IL)

( * ) Notice: Subject to any disclaimer, the term of this patent is extended or adjusted under 35 U.S.C. 154(b) by 39 days.

(21) Appl. No.: 11/127,097

(22) Filed: May 12, 2005

(65) Prior Publication Data

US 2005/0199593 A1    Sep. 15, 2005

Related U.S. Application Data

(63) Continuation-in-part of application No. PCT/IL03/00953, filed on Nov. 12, 2003.

(60) Provisional application No. 60/425,271, filed on Nov. 12, 2002.

(51) Int. Cl.
*B23K 9/08* (2006.01)
(52) U.S. Cl. ............................. 219/123; 219/74; 219/75
(58) Field of Classification Search ................ 219/123, 219/74, 75
See application file for complete search history.

(56) References Cited

U.S. PATENT DOCUMENTS

| | | | |
|---|---|---|---|
| 2,756,311 A | * | 7/1956 | Persson et al. ............. 219/123 |
| 3,519,780 A | | 7/1970 | Potapievsky et al. |
| 3,549,857 A | | 12/1970 | Needham et al. |
| 3,612,807 A | | 10/1971 | Liefkens et al. |
| 4,016,397 A | | 4/1977 | Essers et al. |
| 4,039,800 A | | 8/1977 | Essers |
| 4,142,090 A | | 2/1979 | Essers et al. |
| 4,205,215 A | | 5/1980 | Willems |
| 4,220,844 A | | 9/1980 | Essers |
| 4,234,778 A | | 11/1980 | Willems et al. |
| 6,693,252 B2 | * | 2/2004 | Zhang et al. ................. 219/75 |

FOREIGN PATENT DOCUMENTS

| | | | | |
|---|---|---|---|---|
| JP | 56-4380 A | * | 1/1981 | |
| JP | 58-138568 A | * | 8/1983 | |

* cited by examiner

*Primary Examiner*—Clifford C. Shaw
(74) *Attorney, Agent, or Firm*—Mark M. Friedman

(57) ABSTRACT

A welding system comprises a combined torch that includes a consumable electrode and a non-consumable electrode positioned so that their respective axes form an acute angle and so that arcs initiated from the electrodes intersect a workpiece plane to define an impingement point distance D, and a magnetic mechanism coupled to the torch and used for controlling the distance D during welding. The magnetic mechanism may be a magnetic shield inserted between the electrodes, or a separate magnetic device, e.g. a permanent magnet or electromagnet.

10 Claims, 4 Drawing Sheets

MIG-PLASMA WELDING

CROSS REFERENCE TO RELATED APPLICATIONS

The present invention is a continuation in part of application PCT/IL03/00953 filed 12 Nov. 2003, which claims priority from U.S. provisional patent application No. 60/425,271, filed 12 Nov. 2002, the contents of which are incorporated herein by reference.

FIELD AND BACKGROUND OF THE INVENTION

The present invention relates to a system for welding and a method for employing the system, and more particularly to a combination of Metal-Inert-Gas (MIG) welding and Plasma Arc welding. MIG welding technology has been widely known for many years and is broadly used in industrial applications.

The MIG process, also known as Gas Metal Arc Welding (GMAW), incorporates automatic feeding of a continuous consumable electrode that is shielded from the atmosphere by an externally supplied gas. Of special importance is the transfer of metal from the consumable electrode to the workpiece being welded. The transfer may occur via any one of the following three basic modes: (a) short-circuiting transfer, (b) globular transfer, and (c) spray transfer.

Operation in the spray transfer mode is highly desirable and possible for example in an argon-rich shielding gas. The spray is a highly directed stream of discrete drops, the drops being accelerated by arc forces sufficiently strong to overcome the effects of gravity. The spray transfer mode is possible if the arc current is higher than a so-called transition current, the value of which depends on wire diameter and type of material. However, the high deposition rate typical to the spray transfer mode may produce a weld pool too large to be supported by surface tension in vertical or overhead positions. Also, both the deposition rate and its rate of increase become larger as the welding current increases. This leads to excessive electrode melting and excessive consumption of filler metal.

The above considerations limit the welding speed and the thickness of the material that may be welded in one pass when operating in any of the three modes, leading to the need for multipass welding with different groove types. In addition, a large welding pool produces a high level of welding distortion. If the rate of heat transfer to the workpiece can be accelerated without increasing the filler metal deposition rate, the penetration depth and welding speed can be dramatically increased.

It is known that a combination of commonly used MIG welding with plasma arc welding (PAW) or with Tungsten Inert Gas (TIG) welding can improve welding fusion and increase productivity. The PAW process produces superior quality welds in two: low-current and high-current (keyhole) arc modes. Its main drawback is low speed. The keyhole mode speed is limited by the physical conditions in the weld puddle. Regular speeds for the keyhole mode range from 10 inch per minute (ipm) to 15 ipm.

U.S. Pat. No. 2,756,311 describes a high-speed tandem arc welding employing two or more inert gas shielded arcs in a tandem arrangement, in which a leading arc (MIG) effects penetration and a subsequent (TIG) arc eliminates undercuts by shaping the welding bead without further penetration. Different types of magnetic "focusing" coils are placed around TIG torches co-axially with the tungsten electrodes. However, these focusing or "magnetic deflecting" coils stabilize only the TIG arc, thus making impossible to control the distance between MIG and TIG arcs at their point of impingement with the workpiece during the welding. This is a major disadvantage that leads to the substantial reduction of the combined process welding speed and penetration depth.

U.S. Pat. No. 3,519,780 proposes an augmentation of MIG by TIG torches, by applying different pulses for the MIG and TIG in some sequence. Two separate torches are used without having any electromagnetic influence between the two resulting arcs. Moreover, the average heat input is very limited, as is the case in any pulsed current approach vs. continuous current applications. The particular sequence of the current applied enables only input from only one electrode at a time, thus dramatically reducing the penetration ability of the augmented arc process.

U.S. Pat. No. 3,549,857 discloses another example of an augmented MIG process where two separate torches, namely MIG and TIG, are arranged in tundem and placed so that there is no common welding pool. The main idea is to provide a separate influence of the two energy sources on the weldment, one for the surface preheating and the other for the actual welding. Both torches are connected to the positive and negative terminals of a common power supply, limiting the ability to optimize the energy input by using indepedned power sources to feed the MIG and TIG electrodes.

In U.S. Pat. No. 3,612,807, A. J. Lifkens and W. G. Essers present a method and apparatus for plasma welding with axial feeding of filler wire. This idea is further developed in U.S. Pat. Nos. 4,016,397, 4,039,800, 4,220,844, 4,205,215, 4,234,778, and 4,142,090. A plasma arc is maintained between a non-consumable electrode (non axial) and a workpiece. The plasma stream is constricted by a nozzle. A consumable electrode is guided into the plasma stream coaxially therewith, and a second (MIG) electrode arc is maintained between the end of the consumable electrode and workpiece. The end of the consumable electrode and the MIG arc are both immersed in the plasma stream. Both electrodes must have the same polarity. Due to the axial feeding of the consumable electrode, it has a long region of contact with the plasma arc, leading to its preheating. This results in extremely high deposition rates, without actual penetration to the work piece or substantial increase in the welding speed.

U.S. Pat. No. 5,990,446 describes a process in which two (MIG and TIG) torches are placed on opposite sides of a workpiece. Consumable and no-consumable electrodes have an opposite polarity and use a single power supply. One major disdavantage is that the TIG process requires a constant current power supply, while the MIG process requires a constant voltage power supply. In addition, placing torches on opposite sides of a work piece restricts the common electrical and gas dynamic influence of the arcs to the welding pool, thus limiting the penetration ability and welding speed.

U.S. Pat. No. 6,693,252 discloses methods and apparatuses for Plasma-MIG welding or TIG-MIG welding. The methods include a Plasma or TIG torch for following along a weld path a MIG torch or vice-versa. A constant distance is maintained between the torches, and the angle of the torches relative to the workpiece may vary before welding. The MIG process may be performed EP or EN in various embodiments. The suggested approach of having a fixed distance between torches cannot provide a controlable distance between arcs at the point of their impingement on the specimen during the welding cycle. A "controllable" distance depends on the choosen electric current(s), welding speed, weldable materials and joints configuration. It does not depend on the distance between torches or the angle of the torches relative to the workpiece.

As mentioned above, the MIG process is relatively fast but has limited penetration ability, leading to the need for multipass welding with different groove types. Also, relatively high speed MIG welding is limited by the "undercutting" conditions of the final weld, when the fused zone of the work piece is not filled completely with the molten metal.

Plasma welding provides good final weld quality, however, the welding speed is usually restricted to less than 15 ipm. With reference to FIG. 1, it is well known to those skilled in the art that when the plasma arc welding speed is too great, a weld pool 10 created by a plasma arc 12 remains behind with respect to a welding direction 14 at the intersection of the axis of the plasma electrode with the surface of workpiece 16, causing undercuts and lack of penetration.

Prior art is limited in high-speed applications due to the well known effect of the plasma arc falling behind the arc axis during high speed welding. In prior art, the electric current rates passing through the MIG and plasma electrodes must be limited due to the risk of the plasma arc being blown-up by the MIG arc. This in turn limits the penetration ability of the combined process. Finally, in prior art there is no common body for the consumable and non-consumable electrodes, which significantly limits practical applications due to the dimensional constrains.

SUMMARY OF THE INVENTION

The present invention relates to devices, systems and methods of welding using combinations of MIG welding and plasma arc welding in which the distances between arc impingement points on a workpiece are controllable during the welding process. The control is effected by a transverse magnetic field imposed on the arcs.

According to the present invention there is provided a welding system comprising a combined torch that includes a consumable electrode and a non-consumable electrode positioned so that their respective axes form an acute angle and that arcs initiated from the two electrodes intersect a workpiece to define an "arc impingement point distance" D, and a magnetic mechanism coupled to the torch and used for controlling the distance D during welding.

According to one aspect of the welding system of the present invention, the magnetic mechanism is internal to the combined torch.

According to another aspect of the welding system of the present invention, the magnetic mechanism is external to the combined torch and the control is effected through the application of a transverse magnetic field B.

According to yet another aspect of the welding system of the present invention, the magnetic mechanism includes a magnetic shield inserted between the two electrodes.

According to yet another aspect of the welding system of the present invention, the magnetic mechanism includes a magnet selected from the group consisting of a permanent magnet and an electromagnet.

According to yet another aspect of the welding system of the present invention, the consumable electrode is a MIG electrode and the non-consumable electrode is a plasma arc electrode.

According to yet another aspect of the welding system of the present invention, the non-consumable electrode is a TIG electrode.

According to yet another aspect of the welding system of the present invention, the acute angle is in range of 0 to 30 degrees.

According to yet another aspect of the welding system of the present invention, the distance D is in the range of 5 to 15 mm.

According to yet another aspect of the welding system of the present invention, the consumable electrode is a MIG electrode, the non-consumable electrode is a plasma arc electrode and the transverse magnetic field is given by $10^{-8}I_1I_2/D - 2 \times 10^{-7} < B < 10^{-8}I_1I_2/D$, where $I_1$ is the plasma arc current and $I_2$ is the MIG arc current.

According to yet another aspect of the welding system of the present invention, the system further comprises a feed mechanism operative to advance the consumable electrode.

According to yet another aspect of the welding system of the present invention, the system further comprises a controller coupled to power supplies and to the magnetic mechanism and operative to provide to the magnetic mechanism feedback information regarding electrode electric currents and gas flow parameters, the information used in the control of D.

According to the present invention there is provided a method for welding a workpiece comprising the steps of providing two, first and second, electrodes with respective axes, arranged spatially so as to define an acute angle therebetween; establishing respective electric arcs between each electrode and the workpiece, the arcs characterized by an arc impingement point distance D at a plane of the workpiece; and welding the workpiece while controlling D through the use of a transverse magnetic field.

According to one aspect in the welding method of the present invention, the step of providing first and second electrodes includes providing a consumable first electrode and a non-consumable second electrode.

According to another aspect in the welding method of the present invention, the providing of a consumable electrode includes providing a MIG electrode and the providing of a non-consumable electrode includes providing a plasma arc electrode.

According to yet another aspect in the welding method of the present invention, the providing of a plasma arc electrode includes providing a TIG electrode.

According to yet another aspect in the welding method of the present invention, the step of welding the workpiece while controlling D using a transverse magnetic field includes providing a magnetic mechanism for generating the magnetic field.

According to yet another aspect in the welding method of the present invention, the providing of a magnetic mechanism includes inserting a magnetic shield between the two electrodes.

According to yet another aspect in the welding method of the present invention, the the providing of a magnetic mechanism includes providing a magnetic mechanism external to the two electrodes and controlled independently of a controller coupled to the two electrodes.

According to yet another aspect in the welding method of the present invention, the providing of a magnetic mechanism includes providing a magnetic mechanism external to the two electrodes and controlled by a controller that exchanges information with at least one of the two electrodes.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
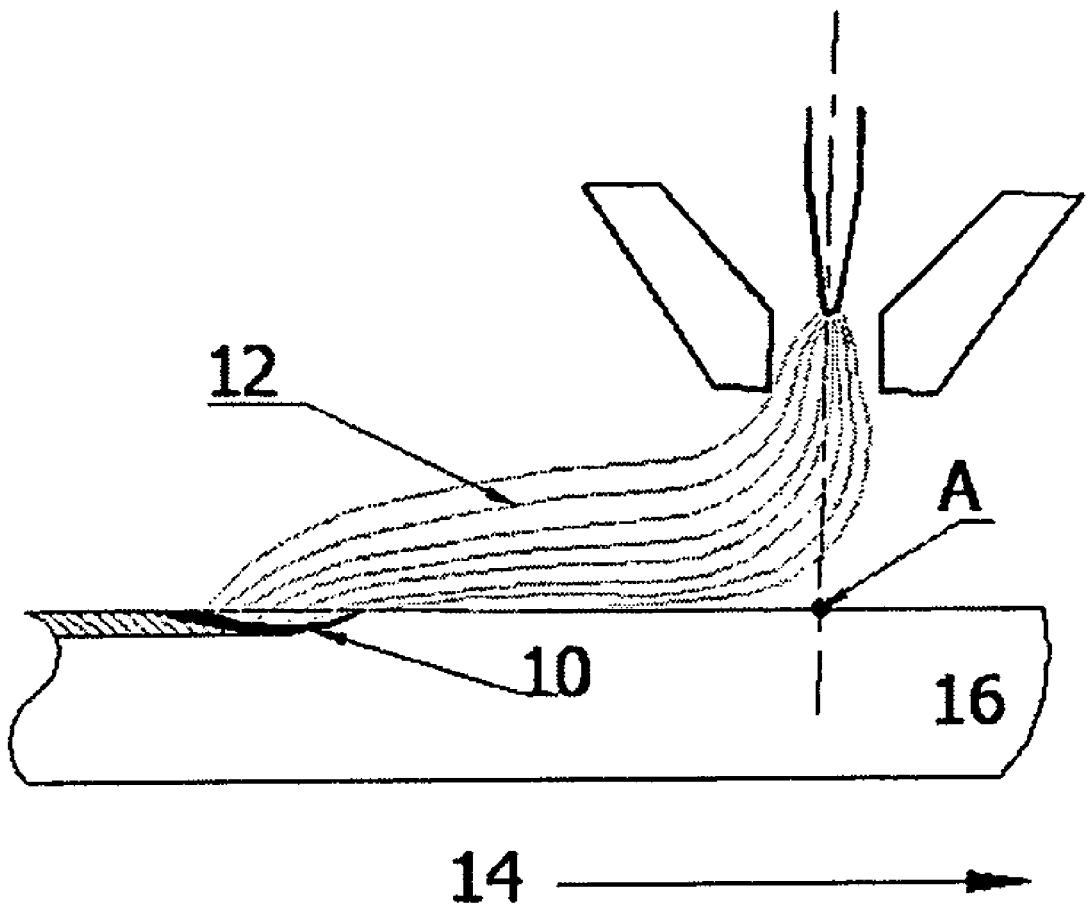
FIG. 1 is a schematic illustration of plasma welding at high welding speed.

The present invention is of a device, system and method that combine PAW with MIG welding in a single integrated processing torch, and which enable control of the distance D (see FIG. 2) between arc impingement points on a specimen (workpiece) surface during the welding process.

A main objective of the present invention is to increase the productivity, quality and robustness of the combined plasma and MIG processes by enhancing the benefits offered by these methods, i.e. the high power density and deep penetration of PAW, and the high arc efficiency and ability to bridge large gaps between workpieces of MIG (GMAW). This goal is attained by combining in a single common-body processing torch 200 (FIG. 2) both a consumable electrode 202 and a non-consumable electrode 204, located in such proximity that assures strong electromagnetic interference between their respective two arcs (a plasma arc 212 and a MIG arc 214) during welding. The invention provides a controllable distance D between arc impingement points 205 and 207. D is defined as a distance between the centers of consumable 214 and non-consumable 212 arcs impingement fields on a workpiece 220 surface. We have determined through numerous experiments and numerical investigations that D affects strongly both the processing speed and the penetration depth in combined plasma—MIG process.

In a preferred embodiment, this controllability is provided by an external transverse magnetic field B (FIG. 2) imposed by a magnetic mechanism (or "device") coupled to the processing torch. Alternatively, control is achieved using a magnetic shield 322 (see FIG. 3) inserted between the electrodes. Magnetic shield 322 is located between a nozzle 307 and a consumable electrode 314 and reduces the magnetic field in the region of the plasma arc, thus reducing the influence of the MIG arc on the plasma arc. Therefore, the magnetic shield is responsible for controlling the distance D between arc impingement points 205 and 207.

In contrast with prior art and known practice, the distance D is controlled during the welding regardless of the electric currents, weldable materials, joint configurations, welding conditions, etc. There is an optimum distance (or range of distances) D that provides a maximum speed increase and penetration depth increase while allowing high quality and cosmetic appearance welds without undercuts. In particular we have determined that the value of D is preferably:

$$D < 5 * (R_{pl} + R_{mig}) \quad [1]$$

where $R_{pl}$ and $R_{mig}$ are correspondingly the radii of plasma arc 212 and MIG arc 214.

Figure 2:
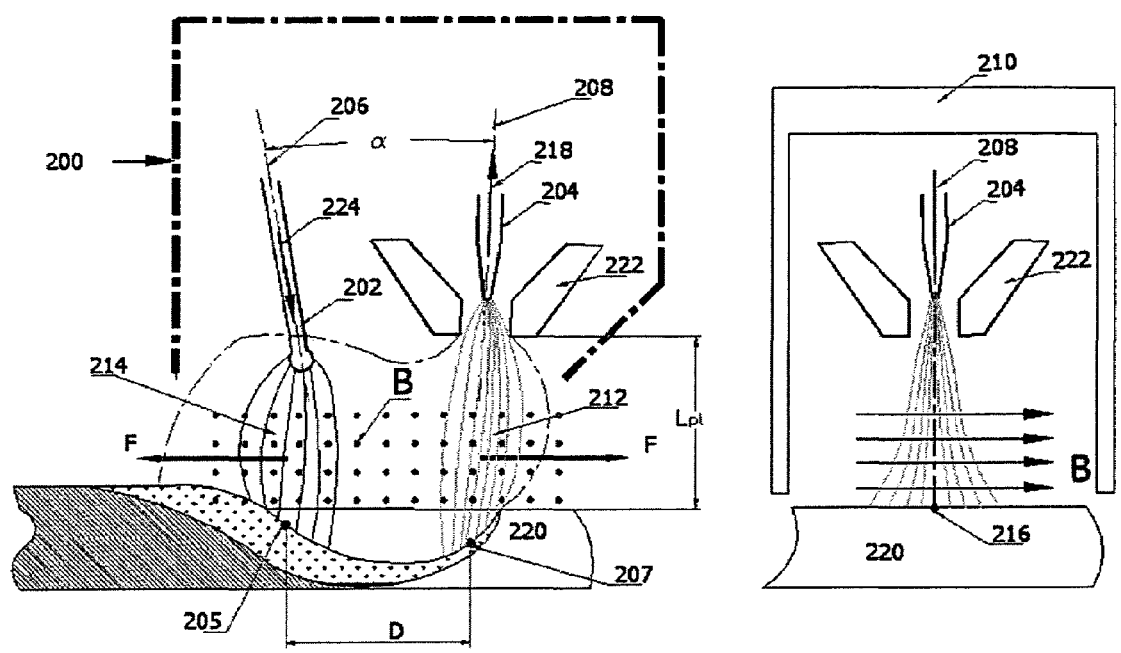
FIG. 2 is a schematic illustration of combined MIG and plasma welding according to the present invention.

Preferably, the consumable and non-consumable electrodes are arranged such that their axes 206 and 208 form an acute angle α, which preferably ranges from 2 degrees to 30 degrees facing the workpiece. Axes 206 and 208 lie in a plane that intersects the workpiece close to the weld line 216 (FIG. 2).

The present invention discloses a system and method that provide a defined and controllable range of distances D regardless of arcs power, electric currents directions, processing speed, materials and joint configurations. As mentioned, the control is effected by a transverse magnetic field B. In preferred embodiments, the field is provided by magnetic devices external to, or integrated in, the combined torch. The main purposes of the magnetic devices is to either provide or change (e.g. in the magnetic shield arrangement) the field B. This contrasts with all prior art arrangements, especially that of U.S. Pat. No. 6,693,252, in which there is no control of D during welding.

Note that in contrast with the magnetic field control of both (MIG/TIG and Plasma) impingement points disclosed herein, the prior art "focusing" and "magnetic deflecting" coils placed around the TIG torch as suggested in U.S. Pat. No. 2,756,311 stabilize only the TIG arc. This makes the control of D as defined above impossible during welding. As mentioned, this is a major disadvantage that leads to the substantial reduction of the processing speed and penetration depth increase.

Let us consider the electromagnetic forces F that affect the arcs and the molten metal in the weld pool. FIG. 2 illustrates the case. Plasma arc 212 is produced by a plasma arc current 218 that flows between workpiece 220 and non-consumable electrode 204. The plasma arc is constricted and directed by a nozzle 222. MIG arc 214 is produced by a MIG arc current 224 that flows between workpiece 220 and consumable electrode 202. Depending of the direction of each current, forces F operate to cause arcs deviation.

In the case in which the two arc currents have the same directions, the electromagnetic forces F tend to bring them together. When the distance between the arcs is too small, the columns of arcs are combined into one, leading to an increase in the deposition rate without substantial increase in the processing speed and penetration. In the case in which the two arc currents have oposite directions (as shown in FIG. 2), the magnetic forces F tend to push them apart. Arcs deflection, resulting in uncontrolable changes of the distance D during the welding, leads to substantial disturbances in the melting pool. Therefore, it is necessary to control D in order to assure a high final weld quality, achieved with maximum processing speed and penetration.

The forces F, which affect each unit of arcs length, have an opposite direction but the same value, given by:

$$F = k'^{*}((I_1 \times I_2)/D \quad [2]$$

where k' is the magnetic constant of free space and $I_1$ and $I_2$ are currents in the plasma arc and MIG arc accordingly. The application of a transverse magnetic field B in the arcs area will change the value of F in the following way:

$$F' = k'^{*}((I_1 \times I_2)/D + (I_1 \times B)) \quad [3]$$

Consequently, creating a transverse magnetic field B provides a control for the distance D regardless of the arcs' electric current directions and magnitudes.

From our extensive experimental data and numerical simulations, we have found out that the values of D need to fulfill equation 1, and preferably should be in the range of 5 to 15 mm. To achieve these values regardless of different welding parameters and conditions, the value of B (in Tesla) must fulfill:

$$10^{-8} I_1 I_2/D - 0.2 M^2/L_{PL} < B < 10^{-8} I_1 I_2/D \quad [4]$$

where the plasma gas mass flow rate M is typically 0.02 kg/m²s, $L_{PL}$ (the plasma arc length—see FIG. 2) is between 0.01 m to 0.1 m, $I_1$ (plasma current 218) is in the range 1 A–400 A and $I_2$ (MIG current 224) is in range 50 A–750 A.

Figure 3:
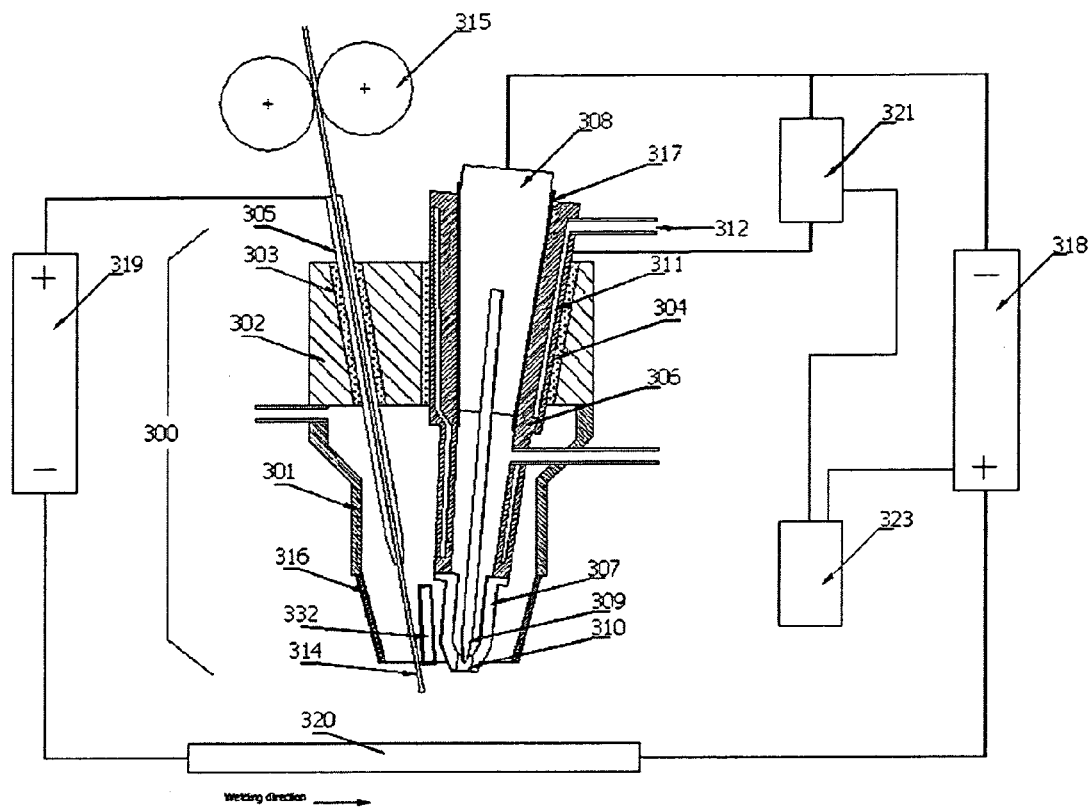
FIG. 3 is a schematic illustration of combined MIG and plasma welding with magnetic device and further details according to the present invention.

FIG. 3 illustrates an embodiment of a welding device according to the present invention. This embodiment includes a single processing torch 300 of the present invention that includes a housing 301 and a cover 302 with two cavities 303 and 304 to place consumable and non-consumable electrodes. A wire guide 305 is located in cavity 303 of cover 302. An inner body 306 with a constricting nozzle 307 located at the downstream end of inner body 306 is located in second cavity 304 of cover 302. A cathode holder 308 operative to hold a cathode 309 is located within inner body 304. Constricting nozzle 307 has an orifice 310 to constrict the plasma arc. Inner body 304 has a channel 311 operative to transport any type of cooling fluid 312. Wire 314 is driven through wire guide 305 by a wire feed mechanism 315. A shielding nozzle 316 at the downstream end of housing 301 surrounds the end of wire 314 and constricting nozzle 307. Cathode holder 308 has preferably a conical shape and is located in a hole in inner body 306. Cathode holder 308 is separated from inner body 306 by an electrically insulating film 317 made of a material with high thermal conductivity and able to tolerate temperatures more than 200° C. Due to the high thermal conductivity and small thickness of insulating film 317, there is good heat transfer from cathode holder 308 to body 306, allowing the device to operate without special cooling of cathode 309, thus permitting a simpler design for the device. A preferably tungsten cathode 309 is connected via cathode holder 308 to the negative terminal of a first direct-current (DC) power supply 318.

Wire 314 is connected via wire guide 305 to the positive terminal of a second DC power supply 319. The positive terminal of first power supply 318 and the negative terminal of second power supply 319 are both connected to a workpiece 320. Preferably, first power supply 318 has a constant-current output characteristic, which provides a stable plasma arc, and second power supply 319 has a constant-voltage output characteristic, so that the length of the MIG arc is self-stabilized, which, in turn, stabilizes the process of wire melting. An optional third, auxiliary DC power supply 321 is connected across cathode 309 and constricted nozzle 307. If auxiliary power supply 321 is used, constricted nozzle 307 must be made of a conductive material. Auxiliary power supply 321 maintains a low-current arc between cathode 309 and nozzle 307. This low-current arc burns before welding begins and provides for preheating of cathode 309, preventing thermal shock damage to cathode 307 when the main plasma arc starts. In addition, this low-current arc provides a plasma flow out toward workpiece 320, facilitating starting of the main arcs.

In one embodiment, a magnetic shield 322 is located between nozzle 307 and consumable electrode 314. Magnetic shield 322 reduces the magnetic field in the region of the plasma arc, thus reducing the influence of the MIG arc on the plasma arc. The magnetic shield is responsible for controlling the distance D between arc impingement points 205 and 207. A control mechanism 323 is operative to coordinate the operation of the various parts of the system.

Control mechanism 323 may be operative to control one or more parameters including, but not limited to, power supply voltages, power supply currents, gas pressures, gas flow rates, cooling fluid pressure, cooling fluid flow rate, cooling fluid temperature, consumable electrode feed rate, welding speed, and magnetic field B. For simplicity, control mechanism 323 is shown as being connected only to power supply 318 and power supply 321, although other connections are possible and within the scope of the present invention.

Figure 4A:
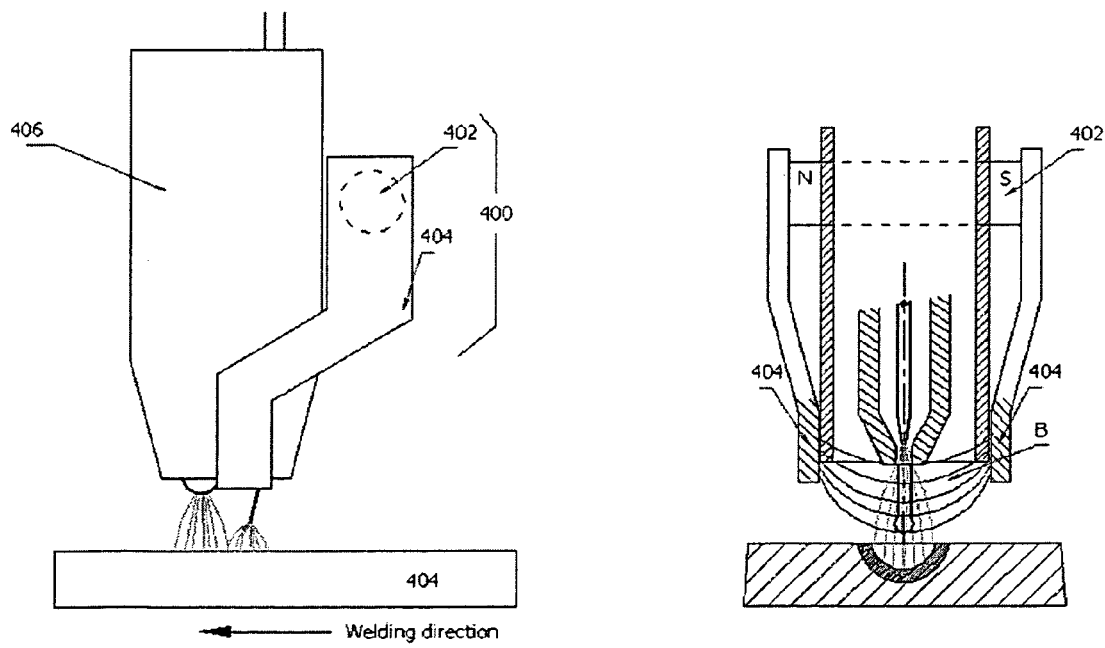
FIG. 4 illustrates scematically different types of magnetic devices useful for incorporation in the combined welding torch of the present invention: a) with permanent magnet; b) with an independently powered electromagnet; c) with an electromagnet powered from the MIG power supply.
Figure 4B:
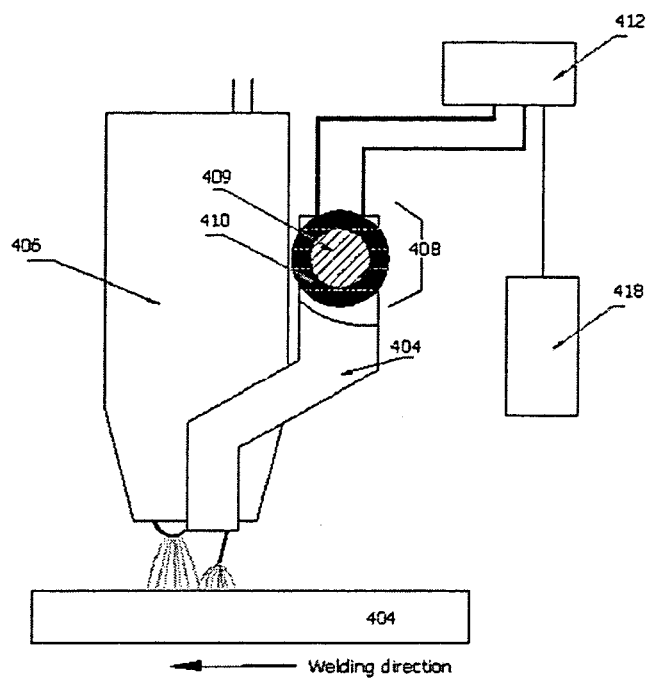
Figure 4C:
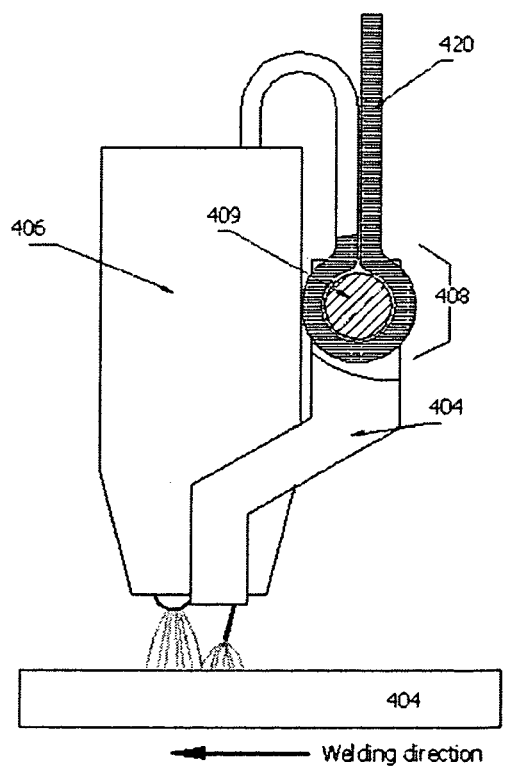

The magnetic field B may be provided by a separate magnetic device, as mentioned above. In one embodiment shown in FIG. 4a, the system comprises a magnetic device 400 that includes a magnet 402 and poles 404. The magnetic device is attached to a housing 406. In various embodiments is possible to use different types of magnets 402, for example a permanent magnet (as in FIG. 4a) or an electromagnet 408 with a core 409 and a coil 410 (as in FIG. 4b). Exemplarily, in FIG. 4b, the electromagnet is powered by a power supply 412. In yet other embodiments (FIG. 4c), electromagnet 408 may be powered by using the current from the MIG arc or by turning (one or two turns) a MIG source power lead 420 around core 409 (see FIG. 4c).

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A welding system comprising:
   (a) a combined torch that includes a consumable electrode and a non-consumable electrode positioned so that their respective axes form an acute angle and so that arcs initiated from the two electrodes intersect a workpiece plane to define an arc impingement point distance D;
   (b) a magnetic mechanism coupled to the torch and used for controlling distance D during welding, and
   (c) a controller coupled to at least one power supply and to the magnetic mechanism and operative to provide to the magnetic mechanism feedback information regarding at least one electrode electric current, the information used in the control of D, and wherein the control is effected through the application of a magnetic field B substantially transverse to a direction of travel of said combined torch relative to said workpiece.

2. The system of claim 1, wherein the feedback information further includes a gas flow parameter.

3. The system of claim 1, wherein the magnetic mechanism is external to the combined torch.

4. The system of claim 1, wherein the feedback information includes information regarding at least two said electrode currents.

5. A welding system comprising:
   (a) a combined torch that includes a consumable electrode and a non-consumable electrode positioned so that their respective axes form an acute angle and so that arcs initiated from the two electrodes intersect a workpiece plane to define an arc impingement point distance D;

(b) a magnetic mechanism external to the torch and coupled to the torch and used for controlling distance D during welding, and (c) a controller coupled to at least one power supply and to the magnetic mechanism and operative to provide to the magnetic mechanism feedback information regarding electrode electric currents and gas flow parameters, the information used in the control of D, and wherein the control is effected through the application of a magnetic field B substantially transverse to a direction of travel of said combined torch relative to said workpiece.

6. A welding method comprising the steps of:

(a) providing a combined torch that includes a consumable electrode and a non-consumable electrode positioned so that their respective axes form an acute angle and so that arcs initiated from the two electrodes intersect a workpiece plane to define an arc impingement point distance D, and (b) controlling distance D, while welding a workpiece, by using feedback information regarding at least one electrode electric current to control a magnetic field B substantially transverse to a direction of travel of said combined torch relative to said workpiece.

7. The method of claim 6, wherein the feedback information further includes a gas flow parameter.

8. The method of claim 6, wherein the magnetic field is established via a magnetic mechanism external to the combined torch.

9. The method of claim 6, wherein the feedback information includes information regarding at least two said electrode currents.

10. A welding method comprising the steps of:

(a) providing a combined torch that includes a consumable electrode and a non-consumable electrode positioned so that their respective axes form an acute angle and so that arcs initiated from the two electrodes intersect a workpiece plane to define an arc impingement point distance D;

(b) providing a magnetic mechanism external to the torch and coupled to the torch, and (c) controlling distance D, while welding a workpiece, using feedback information regarding electrode electric currents and gas flow parameters to control a magnetic field B supplied by said magnetic mechanism and substantially transverse to a direction of travel of said combined torch relative to said workpiece.

* * * * *